United States Patent [19]

Domeier

[11] Patent Number: 4,585,847

[45] Date of Patent: Apr. 29, 1986

[54] CURABLE MOLDING COMPOSITIONS CONTAINING A HALF ESTER OF AN ORGANIC POLYOL

[75] Inventor: Linda A. Domeier, Somerville, N.J.

[73] Assignee: Union Carbide Corporation, Danbury, Conn.

[21] Appl. No.: 671,037

[22] Filed: Nov. 15, 1984

Related U.S. Application Data

[63] Continuation of Ser. No. 279,440, Jul. 1, 1981, abandoned.

[51] Int. Cl.[4] .................. C08F 122/04; C08F 222/04
[52] U.S. Cl. .................................. 526/271; 524/523
[58] Field of Search ........................................ 526/271

[56] References Cited

U.S. PATENT DOCUMENTS

| | | | |
|---|---|---|---|
| 4,015,612 | 4/1977 | Povlik et al. | 526/271 |
| 4,178,327 | 12/1979 | Hall et al. | 526/271 |
| 4,229,559 | 10/1980 | Cotter et al. | 526/271 |
| 4,263,413 | 4/1981 | Gardner et al. | 525/34 |
| 4,289,866 | 9/1981 | Ritz et al. | 526/320 |
| 4,313,859 | 2/1982 | Gardner | 525/502 |
| 4,316,835 | 2/1982 | Gardner | 525/271 |

FOREIGN PATENT DOCUMENTS

2314659 10/1973 Fed. Rep. of Germany ...... 526/271

*Primary Examiner*—Joseph L. Schofer
*Assistant Examiner*—Peter F. Kulkosky
*Attorney, Agent, or Firm*—M. N. Reinisch

[57] ABSTRACT

Described herein are curable molding compositions comprising a mixture of:

(a) a half ester of an organic polyol characterized by the following empirical formula:

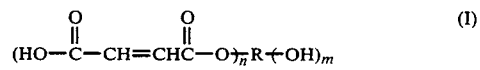

wherein n is a number having an average value of about 1.5 to less than about 4, m is equal to the free valence of R less the average value of n, and R is the hydroxyl-free residue of an organic polyol which contained from 2 to 4, inclusive, hydroxyl groups in formula (I), (b) maleic anhydride, (c) acrylic or methacrylic acid or a functionalized derivative thereof having a molecular weight of less than 300, and (d) an ethylenically unsaturated monomer which is soluble in and copolymerizable with (a), (b), and (c) and which is different from (a), (b), and (c).

The compositions can also contain one or more fibers with a melting point or a glass transition temperature above about 130° C.

16 Claims, No Drawings

CURABLE MOLDING COMPOSITIONS CONTAINING A HALF ESTER OF AN ORGANIC POLYOL

This application is a continuation of prior U.S. application Ser. No. 279,440, filed July 1, 1981, now abandoned.

This invention is directed to a curable molding composition comprising (a) a half ester produced by the reaction of maleic anhydride with an organic polyol, (b) maleic anhydride, (c) acrylic or methacrylic acid or functionalized derivatives thereof, and (d) an ethylenically unsaturated monomer which is soluble in and copolymerizable with (a), (b), and (c) and which is different from (a), (b), and (c).

The combination of components in the composition of this invention have been found to produce reinforced articles having a particularly good balance of mechanical properties. Molded reinforced articles may be produced from the composition of this invention by a very rapid mold cycle which is typically less than about 2 minutes from the time the cure of the resin is initiated.

U.S. Pat. No. 4,263,413 describes compositions comprising a homogeneous liquid mixture of (a) a particular half ester of an organic polyol, (b) maleic anhydride, (c) an ethylenically unsaturated monomer which forms a liquid homogeneous mixture with and is copolymerizable with the half ester and maleic anhydride. Cured materials produced from these resin compositions are described as displaying reduced swelling in organic solvents and reduced water sorption tendencies.

THE INVENTION

It has now been found that when a comonomer i.e., acrylic or methacrylic acid or functionalized derivatives thereof, is added to a half-ester resin containing a half-ester as characterized below, maleic anhydride, and an ethylenically unsaturated monomer, the resulting resin compositions produce reinforced articles having substantially improved mechanical properties over those of composites which do not contain these particular comonomers.

These outstanding composite mechanical properties make these resins especially suitable for the rapid production of glass-reinforced composites via the molding technology described below.

The improved curable molding composition of this invention comprises a mixture of (a) a half ester of an organic polyol characterized by the following empirical formula:

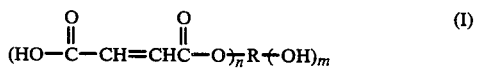
(I)

wherein n is a number having an average value of about 1.5 to less than about 4, m is equal to the free valence of R less the average value of n, and R is the hydroxyl-free residue of an organic polyol which contained from 2 to 4, inclusive, hydroxyl groups in formula (I), (b) maleic anhydride, (c) acrylic or methacrylic acid or a functionalized derivative thereof having a molecular weight of less than 300, and (d) an ethylenically unsaturated monomer which is soluble in and copolymerizable with (a), (b) and (c) and which is different from (a), (b), and (c).

The instant resin compositions have low viscosities, i.e., less than about 100 centipoise, preferably less than about 50 centipoise, so that they can be used to produce thermoset resin articles containing up to about 75 weight percent of reinforcing fibers by a very rapid mold cycle.

The half ester of the organic polyol is characterized by the following empirical formula:

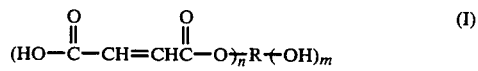
(I)

This half ester is formed by the reaction of maleic anhydride and an organic polyol. Procedures for the preparation of such half esters are described in U.S. Pat. Nos. 4,263,413; 4,229,559; 2,891,989 and 3,784,586. The reaction product described here contains at least 1.5 ester groups. If the polyol contains 4 hydroxyl groups, the reaction product can possess up to 4 half ester groups. If the number of half ester groups is less than the number of hydroxyl groups available from the polyol, the reaction product will contain residual hydroxyl groups. Typically, the maleic anhydride content of the composition does not exceed a total of about 10 mole percent of the amount of maleic anhydride employed in producing the half ester.

The organic polyol which is reacted with the maleic anhydride to form the half ester depicted by empirical formula (I), is typically a polyol which contains at least two carbon atoms and which may contain from 2 to 4, inclusive, hydroxyl groups. These polyols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentane diol, dipropylene glycol, propylene glycol, polypropylene glycol having an average molecular weight of about 150 to about 600, triethylene glycol, 1,4-cyclohexane dimethanol, neopentyl glycol, 2,2-dimethyl-3-hydroxypropyl 2,2-dimethyl-3-hydroxypropionate, triethanolamine, 1,3-butanediol, tetraethylene glycol, 2,2-bis(4-hydroxyphenyl)propane and the ethylene and propylene oxide adducts of 2,2-bis(4-hydroxyphenyl)propane, pentaerythritol, erythritol, glycerine, trimethylolpropane, 1,4-butanediol, 1,6-hexanediol, the polycaprolactone ester of a polyol in which from about 1 to about 5, preferably from about 1.5 to about 4.0 equivalents of caprolactone are reacted with a polyol such as trimethylolpropane or diethylene glycol (preferably the polycaprolactone ester of a polyol is the polycaprolactone ester of trimethylolpropane in which about 1.5 equivalents of caprolactone are reacted with trimethylolpropane or the polycaprolactone ester of trimethylolpropane where about 3.6 equivalents of caprolactone are reacted with trimethylolpropane 2-ethyl-1,3-hexanediol, 1,5-pentanediol, tripropylene glycol, 2,2-bis(4-hydroxycyclohexyl) propane, 1,2,6-hexane triol, 1,3-propane diol, and the like. The most preferred organic polyols are 2,2-dimethyl-3-hydroxypropyl 2,2-dimethyl-3-hydroxypropionate, and 2,2,4-trimethyl-1,3-pentanediol. The use of mixtures of the aforementioned polyols in producing half esters which are soluble in ethylenically unsaturated monomers such as styrene is very desirable. Whereas low cost diols such as 1,2-propylene glycol and diethylene glycol afford half esters with maleic anhydride which are insoluble in styrene, it has been found that mixtures of diols such as those containing said glycols with, for example, 2,2,4-trimethyl-1,3-pentanediol afford half ester compositions which are soluble at room temperature. These compositions can be conveniently utilized in commercial practice.

Component (c) in the composition of this invention is acrylic or methacrylic acid or a functionalized derivative thereof. Mixtures of these may also be used. The functionalized derivatives are characterized by the presence of acrylate, methacrylate, acrylamide, and methacrylamide groups and also by the presence of functional groups such as hydroxyl, amino, alkylamino, ether, and epoxide, for example. The molecular weight of these monomers is typically less than 300. Preferred monomers are characterized by the following formula:

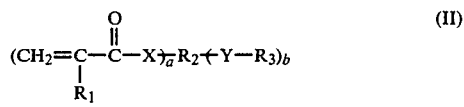
(II)

wherein $R_1$ is independently hydrogen or methyl; X and Y are independently —O— or

wherein $R_4$ is hydrogen or lower alkyl; $R_2$ is an aliphatic or aromatic radical containing from 2 to about 10 carbon atoms, optionally containing —O— or

$R_3$ is hydrogen or an aliphatic or aromatic radical containing from 1 to 10 carbon atoms; and a and b are integers of or greater than 1, preferably 1 to 3.

These functionalized derivatives of acrylic or methacrylic acid include 2-hydroxyethyl acrylate, 2-hydroxyethyl methacrylate, hydroxypropyl acrylate, hydroxypropyl methacrylate, hydroxybutyl acrylate, hydroxybutyl methacrylate, 2-aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethylacrylamide, 2-aminoethyl methacrylamide, diethylene glycol monoacrylate, diethylene glycol monomethacrylate, 2-methoxyethyl acrylate, 2-methoxyethyl methacrylate, pentaerythritol monoacrylate, pentaerythritol monomethacrylate, pentaerythritol diacrylate, pentaerythritol dimethacrylate, pentaerythritol triacrylate, glycerol monoacrylate, glycerol monomethacrylate, trimethylolpropane monoacrylate, trimethylolpropane monomethacrylate, glycidyl methacrylate, glycidyl acrylate, hydroxymethyl acrylamide and the like, or mixtures thereof. It is understood that several isomers of many of these monomers exist and would be suitable for use herein either as individual components or as mixtures with any of the other monomers. Similarly, it is understood that additional derivatives containing aromatic rings and other alkyl groups in the acid or ester portion of Formula II may also be included.

Component (d) of this invention is an ethylenically unsaturated monomer which is soluble in and copolymerizable with (a), (b), and (c) and which is different from (a), (b), and (c).

These ethylenically unsaturated monomers contain at least a single —CH=C< group, and preferably a $CH_2$=C< group and include styrene and its derivatives and homologues, divinylbenzene, diallylphthalate, nonfunctionalized esters of acrylic or methacrylic acid (such as ethyl acrylate, butyl acrylate, and methyl methacrylate), unsaturated nitriles (such as acrylonitrile and methacrylonitrile), and the like. Also, the monomers include vinyl ethers and esters, e.g. vinyl acetate, vinyl propionate, and the like. Mixtures of the afore-mentioned monomers may be effectively employed in the practice of this invention.

The most preferred ethylenically unsaturated monomer contemplated in the practice of this invention is styrene.

In the composition of this invention component (a) is present in amounts of from about 10 to about 75, preferably from about 25 to about 60 weight percent; component (b) is present in amounts of from 0.1 to 5, preferably about 1 weight percent; component (c) is present in amounts of from about 2 to about 75, preferably from about 5 to about 30 weight percent; and component (d) is present in amounts of from about 10 to about 75, preferably from about 25 to about 65 weight percent.

A basic compound may also be added to the composition. The basic compound is selected from an amine or a metal salt of an alcohol or carboxylic acid, or a metal oxide or hydroxide. A preferred basic compound is a secondary or tertiary amine. These amines have a pKb in the range of 3 to 12. These basic compounds are described in U.S. Pat. No. 4,229,559.

A free-radical curing catalyst which initiates curing via the co-reaction of the half ester resin, maleic anhydride, acrylic or methacrylic acid or functionalized derivative thereof, and the ethylenically unsaturated monomer is included in this invention. These curing catalysts include azo compounds, peroxides, peresters, perketals, and the like.

Azo and peroxide curing agents are described by, for example, Gallagher, et al. "Organic Peroxides Review, Plastics Design & Processing, July, 1978, pages 38–42, and August, 1978, pages 60–67, inclusive. The technology disclosed in those two articles is incorporated herein by reference. The choice of the specific peroxide or azo initiators for the purpose of curing the composition of this invention is within the purview of those having skill in this art and the manner in which such peroxides and azo initiators effect a desirable cure is generally characterized in the aforementioned articles.

Examples of such curing catalysts include 1,1-di-t-butylperoxycyclohexane, 2,2-di-t-butylperoxybutane, 2,2-di-t-butylperoxy-4-methylpentane, 2,2-di-cumylperoxypropane, butyl 2,2-di-t-butylperoxyvalerate, 1,1-bis(2,2,4-trimethylpentyl-2-peroxy)cyclohexane, 2,2'-azo-bis-isobutyronitrile, dibenzoyl peroxide, lauroyl peroxide, di-t-butyl peroxide, diisopropyl peroxide carbonate, t-butylperoxy-2-ethylhexanoate, t-butylperivalate, 2,5-dimethylhexane-2,5-di-perethylhexanoate, t-butyl peroctoate, t-butyl perneodecanoate, t-butyl perbenzoate, t-butyl percrotonate, t-butyl perisobutyrate, di-t-butyl perphthalate, 1,1-bis(t-butylperoxy)-3,3,5-trimethylcyclohexane, bis(4-t-butylcyclohexyl)peroxydicarbonate, methyl ethyl ketone peroxide, 2,4-pentanedione peroxide, bis(t-butylperoxy)diisopropylbenzene, 2,4,4-trimethylpentyl-2-peroxycyclohexane carboxylate, 2-t-butylazo-2-cyano-4-methylpentane, ethyl 3,3-di(t-butylperoxy)butyrate, and the like. These are commercially available materials.

The peresters and perketals may be used in combination with an acid cure accelerator as described in Netherlands published Patent Application No. 7604405. These acids include Bronsted acids with a $pK_a$ value lower than or equal to that of formic acid, such as hydrochloric acid, sulfuric acid, nitric acid, phosphoric acid, trichloroacetic acid, p-toluenesulfonic acid, and the like. Also Lewis acids or metal halides with Lewis acid properties, such as boron trifluoride and the chlorides of iron, cobalt, zinc and aluminum, may be used.

Additionally, the above described curing catalysts may be used in combination with other cure accelerators such as cobalt compounds. These cobalt compounds include cobalt naphthenate, cobalt-amine cure promoters (such as those designated as PEP 183-S and available from Air Products Incorporated), and the like. These cure accelerators operate by decomposing the curing catalysts at a temperature below their normal activation or decomposition temperature.

Mixtures of the curing catalysts may be used herein, such as mixtures of peresters and/or perketals, of perketals and azo compounds, and of peresters and azo compounds.

The concentration of the curing agent can be varied within wide limits. As a representative range, the concentration can vary from about 0.25 to about 3.0 weight percent, preferably from about 0.5 to about 2.5 weight percent, and most preferably, from about 0.75 to about 2.0 weight percent, based on the weight of components (a), (b), (c), and (d).

The compositions of this invention are prepared by solution blending the half ester and maleic anhydride, the acrylic or methacrylic acid or functionalized derivative thereof, the ethylenically unsaturated monomer, a free radical curing catalyst, and any other optional ingredients at ambient temperatures.

The fibers, which may be used in this invention as reinforcing agents, have a melting point or a glass transition temperature above about 130° C. These fibers include fiberglass, carbon fibers, aromatic polyamide fibers (such as aramid fibers sold by E. I. duPont de Nemours & Company, Wilmington, Del., under the trademark of Kevlar), metal fibers, such as aluminum and steel fibers, boron fibers, and the like.

The carbon fibers include those having a high Young's modulus of elasticity and high tensile strength. These carbon fibers may be produced from pitch, as described in U.S. Pat. Nos. 3,976,729; 4,005,183 and 4,026,788, for example.

The preferred fibers are fiberglass, carbon fibers, aromatic polyamide fibers, and mixtures thereof.

The fibers which are suitable for use in this invention, preferably, have a length of at least ¼ inch, and an average length of at least ½ inch. Fibers with different lengths exceeding ¼ inch may be used, provided that at least about 50 percent of the fibers have lengths greater than ½ inch. Preferred fiber lengths are from 1 to 2 or more inches. Continuous filaments may also be used.

It is also within the scope of this invention to include the use of fiber reinforcements of shorter lengths and also fillers such as milled glass.

The molded article contains from about 10 to about 75, preferably from about 40 to about 70 weight percent of the reinforcement fiber or from about 20 to about 40 weight percent of milled glass reinforcement.

It is, furthermore, desirable to utilize a vinyl polymerization inhibitor in those cases where the resin solution is to be stored and/or shipped. Suitable vinyl polymerization inhibitors are hydroquinone, para-benzoquinone, t-butyl catechol, quinhydrone, toluhydroquinone, mono-t-butylhydroquinone, 2,5-di-t-butylhydroquinone, hydroquinone monomethyl ether, the biphenol derivatives described in U.S. Pat. No. 4,158,027, and the like. The amount of inhibitor for the purpose of preventing vinyl polymerization can be that conventionally used, namely from about 100 to about 1000 ppm of the combined weight of components (a), (b) and (c) and (d).

The composition of this invention may also include other ingredients, such as mold release agents, and the like.

A preferred procedure for producing a molded article from the compositions of this invention is described in U.S. patent application Ser. No. 135,906 entitled "Molding Process and Apparatus Therefore", and filed on Apr. 14, 1980, now abandoned, in the name of R. Angell, Jr., which is incorporated herein by reference. In this application, a process for rapidly fabricating fiber reinforced thermoset resin articles is described. The fiber reinforcement is comprised of one or more fibers with a melting point or a transition temperature above about 130° C. The process comprises the steps of (a) providing one or more fibers with a melting point or a glass transition temperature above about 130° C. in the form of an interlocked mass in a heatable matched metal die mold, (b) providing in one or more accumulator zones, a liquid body of a thermosettable organic material having a viscosity determined at 120° C., in the absence of curing agent therefore, of less than about 50 centipoise, and which is curable upon heating to a thermoset resin composition, the viscosity of said liquid body being maintained essentially constant in the accumulator zone by keeping its temperaure below that at which curing of said material is substantial, (c) closing the mold containing the web, (d) injecting at least a portion of said thermosettable organic material under pressure from said accumulator zone(s) into the mold to thereby fill the cavity in said mold, (e) initiating the curing of said material in said mold by subjecting the material to a temperature above the temperature at which the curing of said material is initiated, by heating the mold, and (f) opening said mold and removing the cured thermoset article therefrom.

In said U.S. patent application Ser. No. 135,906 the apparatus comprises: (a) a heatable matched die mold containing one or more cavities therein with means for opening said mold to expose such cavities, and closing the same, and means for controlling the injection of a thermosettable organic liquid to such cavities when the mold is closed (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, (d) cooling means associated with the means for controlling the injection of such liquid to such cavities, whereby the temperature of the liquid in such injection means is maintained substantially below the temperature of the mold.

EXAMPLES

The following examples serve to illustrate specific embodiments of this invention and it is not intended that the invention shall be limited by the examples.

In the examples the flexural strength and modulus of the prepared composites were measured according to the procedure described in ASTM D-790. In each example, five separate flexural bars were tested from each plaque and the values listed are the average of those tests.

In each of the following examples a thermocouple was inserted in the mold midway through the glass mat and the cure rate was observed by measuring the time from resin injection to the time of maximum exotherm in the resin. This time span is designated below as the time to peak exotherm and the time given is an average of several runs. The apparatus used was similar to that described in U.S. patent application Ser. No. 135,906 described, supra.

The resins used in the examples are designated as follows and were prepared as described, supra in U.S. Pat. No. 4,263,413;

Resin 1: A maleate half ester was prepared from 75 parts by weight of 2,2,4-trimethyl-1,3-pentane diol, 25 parts of propylene glycol, and 165 parts of maleic anhydride. The maleate half ester was diluted to produce a 50% styrene resin solution that contained about 1% of maleic anhydride.

Resin 2: A maleate half ester was prepared from 75 parts by weight of 2,2,4-trimethyl-1,3-pentane diol, 25 parts by weight of a polycaprolactone triol having a molecular weight of 540 and an hydroxyl number of 310, and 114 parts by weight of maleic anhydride. The maleate half ester was diluted to produce a 50% styrene resin solution that contained about 1% of maleic anhydride.

Control A

Approximately 200 grams (approximately ten 10×5½ inch sheets) Type AKM glass mat (PPG Industries, Inc. Pittsburgh, Penn.) was placed in a 10×5½×3/16 inch constant volume mold preheated to 140° C. The mold was closed, evacuated for about 5 seconds, and a resin portion containing 100 weight percent of Resin 1, 0.5 phr Zelec UN mold release (an organophosphate mold release sold by E. I. duPont de Nemours, Wilmington, Del.), and 1.5 phr of t-butyl perbenzoate was injected at a pressure of 300 psi into the mold. The pressure was maintained for a dwell period of 10 seconds. A time to peak exotherm of about 111 seconds was measured. After 166 seconds, the cured glass reinforced composite was removed from the mold. The composite contained 64 weight percent glass as determined by ashing.

The composite was tested for flexural strength and modulus.

The results are shown in Table I.

EXAMPLE 1

The procedure of Control A was repeated except that the resin contained the following ingredients:
80 wt. percent of Resin 1,
20 wt. percent 2-hydroxyethyl acrylate,
1.5 phr t-butyl perbenzoate, and
0.5 phr Zelec UN mold release.

A time to peak exotherm of about 118 seconds was observed.

The cured composite was removed from the mold after 164 seconds and tested as described in Control A.

The results are shown in Table I.

EXAMPLE 2

The procedure of Control A was repeated except that the resin contained the following ingredients:
80 wt. percent of Resin 1,
22 wt. percent of 2-hydroxyethyl methacrylate,
1.5 phr of t-butyl perbenzoate, and
0.5 phr of Zelec UN mold release.

A time to peak exotherm of about 86 seconds was observed.

The cured composite was removed from the mold after 168 seconds and tested as described in Control A.

The results are shown in Table I.

CONTROL B

The procedure of Control A was repeated except that the resin contained the following ingredients:
100 wt. percent of Resin 2,
1.5 phr of t-butyl perbenzoate, and
0.5 phr of Zelec UN mold release.

A time to peak exotherm of about 109 seconds was observed.

The cured composite was removed from the mold after 166 seconds and tested as described in Control A.

The results are shown in Table I.

EXAMPLE 3

The procedure of Control A was repeated except that the resin contained the following ingredients:
80 wt. percent of Resin 2,
20 wt. percent of 2-hydroxyethyl methacrylate,
1.5 phr of t-butyl perbenzoate, and
0.5 phr of Zelec UN mold release.

A time to peak exotherm of about 112 seconds was observed.

The cured composite was removed from the mold after 166 seconds and tested as described in Control A.

The results are shown in Table I.

TABLE I

| Example | Resin Ingredients[1] | wt. % | Time to peak exotherm (sec.) | Molding time (sec.) | Wt. % glass | Flexural strength (psi) | Flexural Modulus (psi) × $10^6$ |
|---|---|---|---|---|---|---|---|
| Control A | Resin 1 | 100 | 111 | 166 | 64 | 38,600 | 2.30 |
| 1 | Resin 1 | 80 | 118 | 164 | 65 | 45,600 | 2.15 |
|   | HEA | 20 | | | | | |
| 2 | Resin 1 | 80 | 86 | 168 | 64 | 47,600 | 2.39 |
|   | HEMA | 20 | | | | | |
| Control B | Resin 2 | 100 | 109 | 166 | 65 | 38,600 | 2.16 |
| 3 | Resin 2 | 80 | 112 | 166 | 66 | 46,900 | 2.25 |

TABLE I-continued

| | Resin | | Time to peak | | Wt. % | Properties of the Composite | |
| Example | Ingredients[1] | wt. % | exotherm (sec.) | Molding time (sec.) | glass | Flexural strength (psi) | Flexural Modulus (psi) × 10⁶ |
|---|---|---|---|---|---|---|---|
| | HEMA | 20 | | | | | |

HEA = 2-hydroxyethyl acrylate
HEMA = 2-hydroxyethyl methacrylate

What is claimed is:

1. A composition comprising a mixture of:
   (a) from about 10 to about 75 weight percent of a half ester of an organic polyol characterized by the following empirical formula:

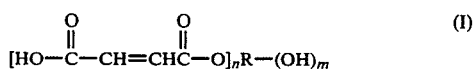
   $$[HO-\overset{O}{\underset{\|}{C}}-CH=CH\overset{O}{\underset{\|}{C}}-O]_n R-(OH)_m \quad (I)$$

wherein n is a number having an average value of about 1.5 to less than about 4, m is equal to the free valence of R less the average value of n, and R is the hydroxyl-free residue of an organic polyol which contained from 2 to 4, inclusive, hydroxyl groups in formula (I);
   (b) from about 0.1 to 5 weight percent of maleic anhydride;
   (c) from about 5 to about 30 weight percent of one or more of 2-hydroxyethyl acrylate, 2-hydroxyethyl methacrylate, hydroxypropyl acrylate, and hydroxypropyl methacrylate; and
   (d) from about 25 to about 65 weight percent of styrene.

2. A composition as in claim 1 wherein the organic polyol is selected from one or more of the following: 2,2,4-trimethyl-1,3-pentanediol, propylene glycol, a polycaprolactone ester of trimethylolpropane wherein about 3.6 equivalents of caprolactone are reacted with trimethylolpropane, 2,2-dimethyl-3-hydroxypropyl 2,2-dimethyl-3-hydroxypropionate, dipropylene glycol, 2,2-bis[4-(2-hydroxyethoxyphenyl]propane, 2,2-dimethyl-1,3-propanediol, 2,2-bis[4-(2-hydroxypropoxy)-phenyl]propane.

3. A curable composition as defined in claim 1 wherein the half ester is present in amounts of from about 10 to about 75 weight percent.

4. A curable composition as defined in claim 1 wherein component (c) comprises 2-hydroxyethyl acrylate.

5. A curable composition as defined in claim 1 wherein component (c) comprises 2-hydroxyethyl methacrylate.

6. A curable composition as defined in claim 1 wherein component (c) is present in amounts of from about 2 to about 75 weight percent.

7. A curable composition as defined in claim 1 wherein styrene is present in amounts of from about 10 to about 75 weight percent.

8. A curable composition as defined in claim 1 which contains a curing initiator.

9. A curable composition as defined in claim 8 wherein the curing initiator is a perester and/or perketal, or a mixture of peresters and/or perketals.

10. A curable composition as defined in claim 8 wherein the curing initiator is an azo and/or peroxide containing compound.

11. A curable composition as defined in claim 8 wherein the curing initiator is a mixture of an azo compound and a perester and/or perketal.

12. A curable composition as defined in claim 8 which contains an acidic cure accelerator.

13. A curable composition as defined in claims 8 or 9, or 10, or 11 or 12 which contains an accelerator comprising a cobalt containing compound.

14. A molded article prepared from the composition of claim 1.

15. A molded article as defined in claim 14 which contains from about 10 to about 75 weight percent of one or more fibers having a melting point or a glass transition temperature above about 130° C.

16. A molded article as defined in claim 15 wherein the fiber is selected from fiberglass, carbon fibers, aromatic polyamide fibers, and mixtures thereof.

* * * * *